United States Patent [19]

Hicks

[11] 4,446,256

[45] May 1, 1984

[54] EPOXIDE RESIN AQUEOUS DISPERSANT COMPRISING THE REACTION PRODUCT OF DIISOCYANATE, DIOL AND POLYETHER GLYCOL MONOETHER

[75] Inventor: Darrell D. Hicks, Jeffersontown, Ky.

[73] Assignee: Celanese Corporation, New York, N.Y.

[21] Appl. No.: 493,857

[22] Filed: May 12, 1983

Related U.S. Application Data

[63] Continuation-in-part of Ser. No. 403,897, Jul. 30, 1982, abandoned.

[51] Int. Cl.³ ............... C08G 18/30; C08G 18/40; C08G 18/58
[52] U.S. Cl. ........................ 523/402; 528/49
[58] Field of Search ............... 523/402; 528/49

[56] References Cited

U.S. PATENT DOCUMENTS

| | | | |
|---|---|---|---|
| 3,549,543 | 12/1970 | Kirstahler et al. | 252/152 |
| 4,079,028 | 3/1978 | Emmons et al. | 524/507 |
| 4,098,772 | 7/1978 | Bonk et al. | 528/49 |
| 4,180,491 | 12/1979 | Kim et al. | 524/317 |

FOREIGN PATENT DOCUMENTS 1069735  5/1967  United Kingdom .

*Primary Examiner*—Maurice J. Welsh
*Attorney, Agent, or Firm*—Herbert P. Price

[57] ABSTRACT

Epoxide resin aqueous dispersants are prepared by reacting n moles of an aromatic, aromatic-based or cycloaliphatic diol with n+1 moles of a diisocyanate and 2 moles of a long-chain, aliphatic, polyether glycol monoether.

9 Claims, No Drawings

EPOXIDE RESIN AQUEOUS DISPERSANT COMPRISING THE REACTION PRODUCT OF DIISOCYANATE, DIOL AND POLYETHER GLYCOL MONOETHER

CROSS REFERENCE TO RELATED APPLICATIONS

This application is a continuation-in-part of Ser. No. 403,897, filed July 30, 1982 (now abandoned).

BACKGROUND OF THE INVENTION

This invention relates to compounds useful for preparing aqueous dispersions of water insoluble compounds. More particularly this invention relates to urethane dispersants used in preparing aqueous dispersions of epoxide-containing resinous or high molecular weight compounds.

In recent years, great emphasis has been placed in the coatings and plastics industry upon the replacement of organic-based solvents with aqueous based systems. The reason for this change has been the increasing cost of these solvents and the pollution problems which result from the escape into the atmosphere of organic-containing compounds, such as hydrocarbons.

Epoxide-containing materials have been known for years to possess extremely desirable properties when used in coatings and plastics. Epoxide resins impart unique strength and chemical resistance properties to coating and plastics formulations. For these reasons, the use of epoxide resins, and more recently the use of aqueous emulsions or dispersions of epoxide-containing materials has increased. However, because of their extreme reactivity and relatively high molecular weight, it has often been difficult to prepare stable, low viscosity, epoxy resin dispersions which are of relatively high solids.

Accordingly, there has been a search for dispersants which will permit the preparation of small particle sized and low viscosity, yet high solids, epoxide dispersions. One method of preparing dispersions has been to employ epoxide-based surfactants prepared by reacting two moles of a hydroxy terminated polyethylene glycol with one mole of a diepoxide. However, complete reaction of these materials without undue chain extension is difficult.

An additional problem which has impeded the preparation of epoxide dispersions is the difficulty in preparing satisfactory dispersants which are compatible with the epoxide resins.

These and other problems are overcome by preparing the compositions of the instant invention which may be employed to prepare small particle-sized, low viscosity, high solids, stable, epoxide resin dispersions. The compositions of the instant invention are of particular utility because they are prepared without undue chain extension.

In British Pat. No. 1,069,735, a process is disclosed for the production of a surface active reaction product which comprises reacting two moles of a diisocyanate, one mole of a dihydroxy polyether, and two moles of a monophenol. However, there is no disclosure in this patent of the use of these products as an epoxide dispersion.

U.S. Pat. No. 3,549,543 discloses a combination of materials useful as low foaming, washing and cleansing agents. Included are certain ethylene oxide adduct dimers prepared using an aliphatic or aromatic diisocyanate. However, the specific compounds of the instant invention are not disclosed, nor is it disclosed to use these materials as dispersants for polyepoxides.

U.S. Pat. No. 4,079,028 discloses the preparation of certain polyurethane-based materials employing polyhydroxy compounds, such as di- and trihydroxy benzene. The hydroxyl terminated prepolymers prepared in this patent generally are end-capped with either a monoisocyanate or a mono/diisocyanate mixture. This patent does not disclose the use of Bisphenol A materials, nor their use in combination with an aliphatic polyether glycol monoether.

SUMMARY OF THE INVENTION

The instant invention involves the preparation of surfactants or dispersants for epoxide-based, resinous materials which are not otherwise water soluble or water dispersible. The dispersant employed in this invention is prepared by reacting n moles of an aromatic, aromatic-based or cycloaliphatic diol, n+1 moles of a diisocyanate, and two moles of a long-chain, aliphatic polyether glycol monoether. The dispersant is illustrated by the following formula:

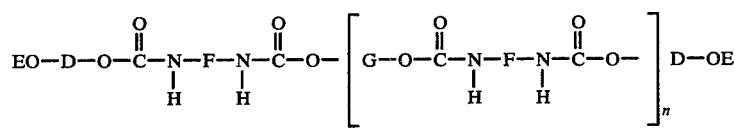

wherein n is 1–10, D is the residue of an aliphatic polyether glycol, G is the residue of an aromatic, aromatic-based or cycloaliphatic diol, F is the residue of a diisocyanate, and E is $C_1$–$C_4$ alkyl.

DESCRIPTION OF THE INVENTION

The diisocyanate materials useful in the instant invention can be represented by the general formula OCN—F—NCO, wherein F is aliphatic, aromatic, aromatic-based or cycloaliphatic having from about 6 to about 20 carbon atoms per molecule. Virtually any type of diisocyanate-containing material may be used in the instant invention, with the only requirement being that the diisocyanate backbone does not contain groups which interfere with its reaction with the diol and the long-chain, aliphatic polyether glycol monoether disclosed hereafter.

Isocyanates have been known for many years and those preferred in the instant invention may be characterized as aromatic, aromatic-based or cycloaliphatic diisocyanates. The term aromatic-based refers to an aromatic isocyanate or precursor which has been partially or fully hydrogenated to form a cycloalkyl or cycloalkene isocyanate. As with the diols used in this invention, it is preferred that the isocyanate be similar in structure to the polyepoxide which will ultimately be dispersed. Accordingly, if long-chain aliphatic epoxides are employed, it is preferable to use long-chain aliphatic isocyanates, such as, for example, hexamethylene diisocyanate, octamethylene diisocyanate, decamethylene diisocyanate and the like. However, in most cases, since the polyepoxide employed will have an aromatic backbone, such as Bisphenol A, it is preferred that aromatic, aromatic-based or cycloaliphatic diisocyanates be employed. Among the most preferred of the diisocyanates are isophorone diisocyanate, bis(p-phenyl isocyanate), bis(p-phenyl) methylene diisocyanate, bis(p-phenyl cyclohexyl) methylene diisocyanate, 2,4-toluene diisocyanate, 2,6-toluene diisocyanate, 1,4-phenylene diisocyanate, 1,3-phenylene diisocyanate, 4,4'-diphenylmethane diisocyanate, 4,4'-diphenyldimethylmethane diisocyanate, 1,5-naphthalene diisocyanate, 1,4-cyclohexane diisocyanate and the like.

The second major component of this invention is an aromatic, aromatic-based or cycloaliphatic diol. As used herein the phrase aromatic-based material includes aromatic diols which have been partially or fully hydrogenated. The diols useful in this invention are exemplified by resorcinol, hydroquinone, p,p'-dihydroxybenzophenone, p,p'-dihydroxydiphenyl, p,p-dihydroxydiphenyl ethane, bis(2-hydroxynaphthylmethane), 1,5-dihydroxynaphthalene, and p,p'-dihydroxydiphenyl propane or Bisphenol A as it is commonly called. Also included are hydrogenated Bisphenol A, 1,4-cyclohexanediol, 1,3-cyclopentanediol, cyclohexanedimethanol, and the like. Other useful compounds are the various halogenated derivatives of the above-identified materials, such as the polyhalogenated bisphenols, including tetrabromo Bisphenol A.

The third component of the instant invention is a long-chain, aliphatic polyether glycol monoether having the general formula E—O—D—O—H, wherein E is a $C_1$-$C_4$ alkyl, and D is the residue of an aliphatic polyether glycol having a molecular weight of about 1000 to about 15,000. The preferred materials for use in this invention are the $C_1$-$C_2$ monoalkyl ethers of the polyoxyethylene glycols. The polyether products include polyethylene oxide adducts, which are polyethylene glycol polyethers, as well as block copolymers of ethylene oxide and propylene oxide which contain about 50 to about 90 weight percent ethylene oxide and about 10 to about 50 weight percent propylene oxide.

The polyether or glycol monoethers employed in this invention are prepared using methods well known in the art.

By employing the terms diisocyanate, diol, or glycol in the above descriptions, it is not meant to preclude those materials which comprise a mixture of mono- and polyfunctional materials, so that on the average the product employed contains approximately two functional groups. For purposes of this invention, the terms diisocyanate, glycol and diol include materials having on the average about 1.5 to about 2.8 functional groups per molecule.

To prepare the compositions of this invention, about two moles of the long-chain monoalcohol are reacted with n moles of the diol and n+1 moles of the diisocyanate. Preferably, n should be no greater than about 10, as higher molecular weight products are not as effective as epoxide resin dispersants. Most preferably, n is 1 to about 5.

Although there are many methods for co-reacting the materials disclosed above, the most preferred reaction method involves adding to the reactor the diol and the long-chain monoalcohol. This mixture is then heated to melting (usually in the range of about 60°–80° C.). At this point a reaction catalyst may be added.

Examples of the reaction catalysts include virtually any type of catalyst which will catalyze the reaction between the isocyanate, the alcohol and the diol. Included among these catalysts are tertiary amines and the various organo-metallic compounds and carboxylic acid salts of metals, such as tin, lead and mercury. Specific examples of such catalysts include trialkyl amines, as well as dialkyl tin dialkoxylates, including dibutyl tin dilaurate and the like. The amount of the catalyst to be added to the reaction mixture can vary widely, depending upon the speed of reaction which is desired and the particular reactants which have been chosen. However, generally, about 0.1–5%, by weight, based on the total weight of the reactants, of the reaction catalyst is added to the reaction mixture.

Following addition of the catalyst, the diisocyanate is added and the mixture is held at reaction temperature until all of the isocyanate groups have disappeared. Isocyanate reaction is monitored using standard techniques by removing a sample of the material, adding an amine, such as dibutylamine, and back titrating with an acid such as HCl. Usually, reaction of all isocyanate groups requires from about one-half hour to two hours of heating at reaction temperature.

The resulting product may then be used as a dispersant or surfactant for various epoxide resins. Although virtually any type of epoxide resin may be dispersed in water using this invention, the dispersants described herein are particularly useful with aromatic-based polyepoxide resins in view of the good hydrolytic stability of these epoxide resins. Such polyepoxides are well known in the art and are prepared by reacting diphenols of the type disclosed above with at least an equivalent, and preferably an excess, based upon phenolic hydrogens, of an epihalohydrin, preferably epichlorohydrin. The preferred epoxide resins are the glycidyl polyethers of Bisphenol A having an epoxide equivalent weight of about 180 to about 1000.

Dispersion of the epoxide resin with the dispersing agent prepared above may be accomplished by any one of several methods well known in the art. The preferred method of dispersing involves adding the epoxide resin to the reactor along with the dispersing agent. The two materials are then heated together, if necessary, in order to melt the polyepoxide, and a compatible blend is obtained.

At this point, it may be desirable to add up to about 30%, by weight, based on the polyepoxide and the dispersant, of a co-solvent. Examples of such materials include the glycols, glycol ethers and glycol esters, including materials such as the various Cellosolves, such as the monoethyl ether of ethylene glycol (ethyl Cellosolve), butyl Cellosolve (monobutyl ether of ethylene glycol) and Cellosolve acetate (acetate ester of monoethyl ether of ethylene glycol). (Cellosolve is a registered trademark of the Union Carbide Company). Added to the reaction mixture along with the co-solvent is the amount of water desired. The amount of water present and the temperature at the point of inversion are critical in preparing emulsions which are of small, uniform particle sizes. At 80°–95° C., the water required is usually that amount needed to produce an emulsion having 72–77% solids. This mixture is then held under agitation at the desired temperature until a stable dispersion is obtained. (In some cases it may be necessary to increase the temperature slightly in order to form a stable dispersion.) Dispersion stability may be measured by monitoring its viscosity and holding at temperature until a stable viscosity is obtained.

To effect dispersion of the epoxide resin at least about 2% of the dispersant should be employed. The maximum amount of the dispersant should be the minimum amount necessary to form a stable dispersion. Generally, no more than about 15% based on the total weight of the dispersion solids is needed. The amount of water in which the epoxide is dispersed may also vary widely, depending upon the epoxide resin and dispersants which are chosen. However, the normal solids content of the final product is in the range of about 35–70% by weight.

An alternative method of effecting dispersion of the epoxide resin involves mixing the surfactant and water and then adding the epoxide resin to this mixture slowly over a period of a few minutes up to several hours. In the event the epoxide resin which is chosen is solid, it is necessary to heat the material to its melting point.

The products prepared according to the instant invention may be modified with conventional fillers, pigments, reinforcing agents and other conventional aqueous or aqueous-based binders, modifiers, extenders and the like.

The resulting dispersed epoxide resins may be formulated into one or two package systems. With two package systems an epoxide curing agent, such as an amine or an amido/amine, is added to the dispersion shortly before use. In one package systems, on the other hand, the epoxide resin and the curing agent are mixed together initially. Baking of these systems for up to one-half hour at temperatures of from 100°–200° C. is required to achieve the final cure.

The dispersed products of this invention may be employed in various plastics end uses, including, preferably, as protective coatings. The most frequent use of these coatings is in the industrial maintenance coating area where two package systems are employed. In addition, these materials may be used as coatings for printed circuit boards.

In the following examples, all parts and percentages are by weight, unless otherwise indicated.

EXAMPLE 1

Into a reactor equipped with a mechanical agitator and thermometer were added 629.3 parts of MPEG-5000 and 28.7 parts of Bisphenol A. (MPEG-5000 is a methoxy terminated polyethylene glycol polyether having a molecular weight of about 5000, supplied by the Union Carbide Company, with a freezing point of 59.2° C.) The reactor was blanketed with nitrogen and the mixture heated under agitation to 60°–80° C., at which time, 0.7 part of dibutyl tin dilaurate was added. With the temperature at 82° C., 42 parts of isophorone diisocyanate (equivalent weight 111) were added and the resulting reaction mixture was held at temperatures ranging to about 100° C. for two and one-half hours. A dispersant resulted which exhibited a Gardner-Holdt 25° C. viscosity of O-P at 10% solids in water.

EXAMPLE 2

Into a reactor equipped with a mechanical agitator and thermometer were added 1164.0 parts of Epi-Rez 520 and 36.0 parts of the neat dispersant prepared in Example 1. (Epi-Rez 520 is a glycidyl polyether of Bisphenol A having a weight per epoxide of about 502 and is available from Celanese Specialty Resins Company.) The materials were heated together for approximately 20 minutes at temperatures ranging up to 115° C. Added to the reactor with the reactor temperature at approximately 95° C. were 168.0 parts of ethyl Cellosolve and 232.0 parts of water. (Ethyl Cellosolve is monoethyl ether of ethylene glycol and is available from the Union Carbide Company.) This mixture was then held at approximately 85° C. for one hour and ten minutes, at which point 582.0 parts of water were added, and the resulting mixture was held at temperatures ranging from 85°–65° C. for one hour and fifteen minutes. The resulting epoxide resin dispersion exhibited a Brookfield viscosity using a No. 2 spindle and 20 rpm speed of 840 cps and a particle size range of 1.0–1.5 microns.

EXAMPLE 3

Utilizing essentially the same procedures as described in Example 1, the following were prepared. In the following table the column labeled "Type" shows the particular polyether, the heading "Moles" indicates the number of moles of the polyether which are employed in the reaction. Under the column "Poly (NCO)" are indicated the various types of diisocyanates employed. Under the heading "Bisphenol Moles" are indicated the number of moles of Bisphenol A employed in the reaction. "Rx. Temp." shows the temperatures employed to prepare the polymer in degrees Centigrade, and under "Viscosity" is listed the Gardner-Holdt 25° C. viscosity at 40% solids in water, except where indicated otherwise.

In this table, the following components were employed:

MPEG-5M is MPEG-5000, a methoxy terminated polyethylene glycol having a molecular weight of about 5000 supplied by Union Carbide Company with a freezing point of 59.2° C.

MPEG-2M is MPEG-2000, the same material as MPEG-5M, except that it has a molecular weight of about 1900, and a freezing point of 51.9° C.

MRS-10 is a polymethylene polyphenyl isocyanate having an isocyanate functionality of 2.4 and an isocyanate equivalent weight of 132. It is available from the Mobay Chemical Company.

Des. W is Desmodur W., which is dicyclohexyl methane, 4-4' diisocyanate. It is also available from the Mobay Chemical Company.

IPDI is isophorone diisocyanate.
TDI is toluene diisocyanate.

TABLE I

| Ex. No. | Polyether Type | Moles | Poly (NCO) Type | Moles | Bisphenol Moles | Rx. Temp. | Viscosiy |
|---|---|---|---|---|---|---|---|
| A | MPEG-5M | 2 | Des.W. | 1 | — | 80–90 | V–W |
| B | MPEG-5M | 2 | Des.W. | 2 | 1 | 90–95 | $Z_5$ |
| C | MPEG-5M | 2 | Des.W. | 3 | 2 | 87–108 | I–J (10%) |
| D | MPEG-2M | 1 | MRS-10 | 1 eq. | — | 84–95 | N–O |
| E | MPEG-5M | 2 | IPDI | 3 | 2 | 83–102 | P–Q (10%) |
| F | MPEG-5M | 2 | IPDI | 4 | 3 | 82–101 | — |

TABLE I-continued

| Ex. No. | Polyether Type | Moles | Poly (NCO) Type | Moles | Bisphenol Moles | Rx. Temp. | Viscosiy |
|---|---|---|---|---|---|---|---|
| G | MPEG-5M | 2 | IPDI | 2 | 1 | 81–99 | — |
| H | MPEG-5M | 2 | IPDI | 3 | 2 | 85–100 | $Z_6$ |
| I | MPEG-5M | 2 | TDI | 6 | 5 | 52–73 | Gel |
| J | MPEG-5M | 2 | IPDI | 6 | 5 | 80 | Insoluble |
| K | MPEG-5M | 2 | TDI | 5 | 4 | 49–73 | Clear gel |

EXAMPLE 4

Employing the procedures described in Example 2, aqueous dispersions of Epi-Rez 520 epoxide resin, were prepared using the Examples E through K appearing in Table I as the dispersant. In Table II, "% Dispersant" indicates the weight percentage of the dispersant employed, "% Solids" indicates the weight percent solids in water of the dispersion, "Visc." indicates the 20 rpm Brookfield viscosity in centipoise using a #2 spindle at 25° C. and "Particle Size" is given in microns and indicates the percent of the dispersed material falling within each of the particle size ranges listed.

TABLE II

| Ex. No. | % Dispersant | % Solids | Visc. (cps) | Particle Size % In Range Of | | |
|---|---|---|---|---|---|---|
| | | | | 0.6–1.0 | 1.0–2.5 | 2.5 |
| E | 6 | 55 | 2,570 | 87 | 13 | 0 |
| F | 6 | 55 | 8,930 | 84 | 12 | 4 |
| G | 6 | 55 | 856 | 72 | 28 | 0 |
| H | 6 | 55 | 530 | 55 | 44 | 1 |
| I | 8 | 55 | 1,460 | 48 | 51 | 1 |
| J | 6 | 55 | 25,200 | 41 | 47 | 12 |
| K | 6 | 55 | 954 | 26 | 70 | 4 |

EXAMPLE 5

22.6 parts (0.024 epoxide equivalents) of the 55% solids in water dispersion described in Table II-E were mixed with 15.2 parts (0.028 available amine hydrogen equivalents) of a polyamido amine curing agent having an amine hydrogen equivalent weight of 324. The curing agent, Epi-Cure CT-60-8536, available from the Celanese Specialty Resins Company, was prepared by salting 16% of the available amine nitrogens on a preferred amido amine acetic acid polymer and reducing the resulting salt to 60% solids in a 60/20/20 by weight solvent mixture of butyl Cellosolve/ethyl Cellosolve/toluene. The resulting epoxy/curing agent blend exhibited a solids content of 43.7%. A three mil film was prepared of this blend on Bonderite treated steel. The film became tack free after two to three hours at room temperature. After six days at room temperature, the film exhibited a pencil hardness of B-HB, along with good mar resistance and excellent gloss and adhesion.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. An epoxide resin aqueous dispersant comprising the reaction product of about n+1 moles of a diisocyanate, n moles of an aromatic, aromatic-based or cycloaliphatic diol, and 2 moles of a long-chain, aliphatic polyether glycol monoether, wherein n is 1–10, and wherein the long-chain, aliphatic polyether glycol monoether is derived from an aliphatic polyether glycol having a molecular weight of about 1000 to about 14,000.

2. The dispersant of claim 1 wherein n is 1–5.

3. The dispersant of claim 1 wherein the diisocyanate is an aromatic diisocyanate, the diol is a diphenol and the polyether glycol monoether is a $C_1$–$C_4$ monoalcohol ether of a polyethylene glycol.

4. An aqueous dispersant having the general formula:

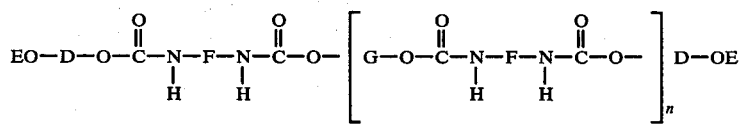

wherein n is 1–10, D is the residue of an aliphatic polyether glycol having a molecular weight of about 1000 to about 15,000, E is $C_1$–$C_4$ alkyl, F is the residue of a diisocyanate, and G is the residue of an aromatic, aromatic-based or cycloaliphatic diol.

5. The dispersant of claim 4 wherein D is a polyethylene glycol polyether residue, E is a $C_1$–$C_2$ alkyl, F is an aromatic diisocyanate residue, and G is the residue of p,p'-dihydroxydiphenyl propane.

6. A process for preparing an epoxide resin dispersion which comprises
   (a) forming a reaction product of about n+1 moles of a diisocyanate, n moles of an aromatic, aromatic-based or cycloaliphatic diol, and about 2 moles of a long-chain, aliphatic, polyether glycol monoether; and
   (b) forming an aqueous dispersion of an epoxide resin employing the resulting reaction product.

7. The process of claim 6 wherein the reaction product is employed at about the 2 to about the 15 percent by weight level, based on the total epoxide resin/reaction product weight, and wherein the aqueous dispersion has a solid weight content of about 35 to about 20 percent.

8. The process of claim 6 wherein the isocyanate is an aromatic diisocyanate, the diol is a diphenol, the polyether glycol is based upon ethylene glycol, and the epoxide resin is a diglycidyl ether of Bisphenol A, having a weight per epoxide of about 180 to about 1000.

9. The process of claim 6, wherein up to about 30% by weight, based on the epoxide resin/reaction product content of a co-solvent is employed.

* * * * *

UNITED STATES PATENT AND TRADEMARK OFFICE
CERTIFICATE OF CORRECTION

PATENT NO. : 4,446,256

DATED : May 1, 1984

INVENTOR(S) : Darrell D. Hicks

It is certified that error appears in the above—identified patent and that said Letters Patent is hereby corrected as shown below:

Column 8, line 20, delete "14,000" and insert -- 15,000 --.

Signed and Sealed this

Twenty-eighth Day of August 1984

[SEAL]

Attest:

GERALD J. MOSSINGHOFF

Attesting Officer

Commissioner of Patents and Trademarks